US 9,218,389 B2

(12) United States Patent
Woodruff

(10) Patent No.: US 9,218,389 B2
(45) Date of Patent: *Dec. 22, 2015

(54) FAST DISTRIBUTED DATABASE FREQUENCY SUMMARIZATION

(71) Applicant: International Business Machines Corporation, Armonk, NY (US)

(72) Inventor: David P. Woodruff, Mountain View, CA (US)

(73) Assignee: International Business Machines Corporation, Armonk, NY (US)

(*) Notice: Subject to any disclaimer, the term of this patent is extended or adjusted under 35 U.S.C. 154(b) by 112 days.

This patent is subject to a terminal disclaimer.

(21) Appl. No.: 14/022,402

(22) Filed: Sep. 10, 2013

(65) Prior Publication Data
US 2014/0258333 A1    Sep. 11, 2014

Related U.S. Application Data

(63) Continuation of application No. 13/790,098, filed on Mar. 8, 2013.

(51) Int. Cl.
*G06F 7/00* (2006.01)
*G06F 17/30* (2006.01)

(52) U.S. Cl.
CPC .... *G06F 17/30386* (2013.01); *G06F 17/30539* (2013.01)

(58) Field of Classification Search
CPC .............. G06F 17/30194; G06F 17/30539
See application file for complete search history.

(56) References Cited

U.S. PATENT DOCUMENTS

| 6,147,976 | A * | 11/2000 | Shand et al. | 370/254 |
| 2007/0011566 | A1* | 1/2007 | Gray et al. | 714/758 |
| 2009/0303901 | A1* | 12/2009 | Duffield et al. | 370/253 |
| 2011/0010409 | A1* | 1/2011 | DeLaquil et al. | 708/446 |
| 2013/0336588 | A1* | 12/2013 | Rane et al. | 382/197 |

OTHER PUBLICATIONS

Ailon et al. ("The Fast Johnson-Lindenstrauss Transform and Approximate Nearest Neighbors" 2009, Society for Industrial and Applied Mathematics, SIAM J. Comput. vol. 39, No. 1, pp. 302-322).*

(Continued)

*Primary Examiner* — Fred I Ehichioya
*Assistant Examiner* — Kris Mackes
(74) *Attorney, Agent, or Firm* — Cantor Colburn LLP

(57) ABSTRACT

A mechanism is provided for computing the frequency packets in network devices. Respective packets are associated with entities in a vector, where each of the entities is mapped to corresponding ones of the respective packets, and the entities correspond to computers. Upon a network device receiving the respective packets, a count is individually increased for the respective packets in the vector respectively mapped to the entities, and computing a matrix vector product of a matrix A and the vector. The matrix A is a product of at least a first matrix and a second matrix. The first matrix includes rows and columns where each of the rows has a single random location with a one value and remaining locations with zero values. The matrix vector product is transmitted to a centralized computer for aggregating with other matrix vector products.

7 Claims, 7 Drawing Sheets

(56) References Cited

OTHER PUBLICATIONS

Dimitris Achlioptas, "Database-friendly Random Projections: Johnson-Lindenstrauss with Binary Coins," www.computerscienceweb.com, Academic Press, Journal of Computer and System Sciences, 66 (2003) 671-687, received Aug. 28, 2001, revised Jul. 19, 2002, 17 pages.

Nir Ailon, "Fast Dimension Reduction Using Rademacher Series on Dual BCH Codes," Edo Liberty, Discrete Comput Geom (2009), 42: 615-630, received Nov. 8, 2007, revised Jun. 9, 2008, accepted Sep. 4, 2008, published online Sep. 26, 2008, 16 pages.

Noga Alon, "Perturbed Identity Matrices Have High Rank: Proof and Applications," Combinatorics, Probability and Computing (2009) 18, 3-15, received Nov. 15, 2006, revised Nov. 17, 2007, first published online Jan. 16, 2008, 13 pages.

Baraniuk et al., "A Simple Proof of the Restricted Isometry Property for Random Matrices," Constr Approx (2008) 28:253-263, received May 17, 2006, revised Jan. 18, 2007, accepted Feb. 5, 2007, published online Jan. 15, 2008, 11 pages.

Barbara et al., "Detecting Novel Network Instursions Using Bayes Estimators," Funded by AFRL Rome Labs, contract F 30602-00-2-0512, In Proceedings of the First SIAM International Conference on Data Mining, 2001, 17 pages.

Charikar, et al., "Finding Frequent Items in Data Streams," P. Widmayer et al. (Eds.): ICALP 2002, LNCS 2380, pp. 693-703, 2002, 11 pages.

Cormode et al., "What's Hot and What's Not: Tracking Most Frequent Items Dynamically," ACM Transactions on Database Systems, vol. 30, No. 1, Mar. 2005, pp. 249-278, 30 pages.

Demaine, et al., "Frequency Estimation of Internet Packet Streams with Limited Space," R. Mohring and R. Raman (Eds.): ESA 2002, LNCS 2461, pp. 348-360, 2002, 13 pages.

Ganguly et al., "CR-Precis: A Deterministic Summary Structure for Update Data Streams," ESCAPE 2007, LNCS 4614, pp. 48-59 2007, 12 pages.

Sumit Ganguly, "Data Stream Algorithms via Expander Graphs," S. H. Hong, H. Nagamochi, and T. Fukunaga (Eds.): ISAAC 2008, LNCS 5369, pp. 52-63, 2008, 12 pages.

Karp et al., "A Simple Algorithm for Finding Frequent Elements in Streams and Bags," ACM Transactions on Database Systems, vol. 28, No. 1, Mar. 2003, pp. 5-55, 5 pages.

Kotidis et al., "QuckSAND: Quick Summary and Analysis of Network Data," DIMACS Technical Report 2001-43, Nov. 2001, 25 pages.

Renjit et al., "Mining the Data from Distributed Database Using an Improved Mining Algorithm," International Journal of Computer Science and Information Security (IJCSIS), vol. 7, No. 3, pp. 116-121, Mar. 2010; Publisher: LJS Publisher and IJCSIS Press.

Strauss et al, "One Sketch for All: Fast Algorithms for Compressed Sensing," STOC '07, Jun. 11-13, 2007, San Diego, CA, Copyright 2007, ACM 978-1-59593-631-8/07/0006, 10 pages.

Veloso et al., "Efficient, Accurate and Privacy-Preserving Data Mining for Frequent Itemsets in Distributed Databases," 18th Brazilian Symposium on Databases, pp. 281-292, Manaus, Amazonas, Brazil, 2003; Publisher: Computer and Information Science Department, Ohio-State University.

Zhu et al., "Discovering Relational Patterns across Multiple Databases," 23rd International Conference on Data Engineering (ICDE 2007), pp. 726-735, 2007; Publisher: IEEE.

\* cited by examiner

FIG. 2

The matrix A = P*H*D, as shown below:

$$A = P \cdot H \cdot D$$

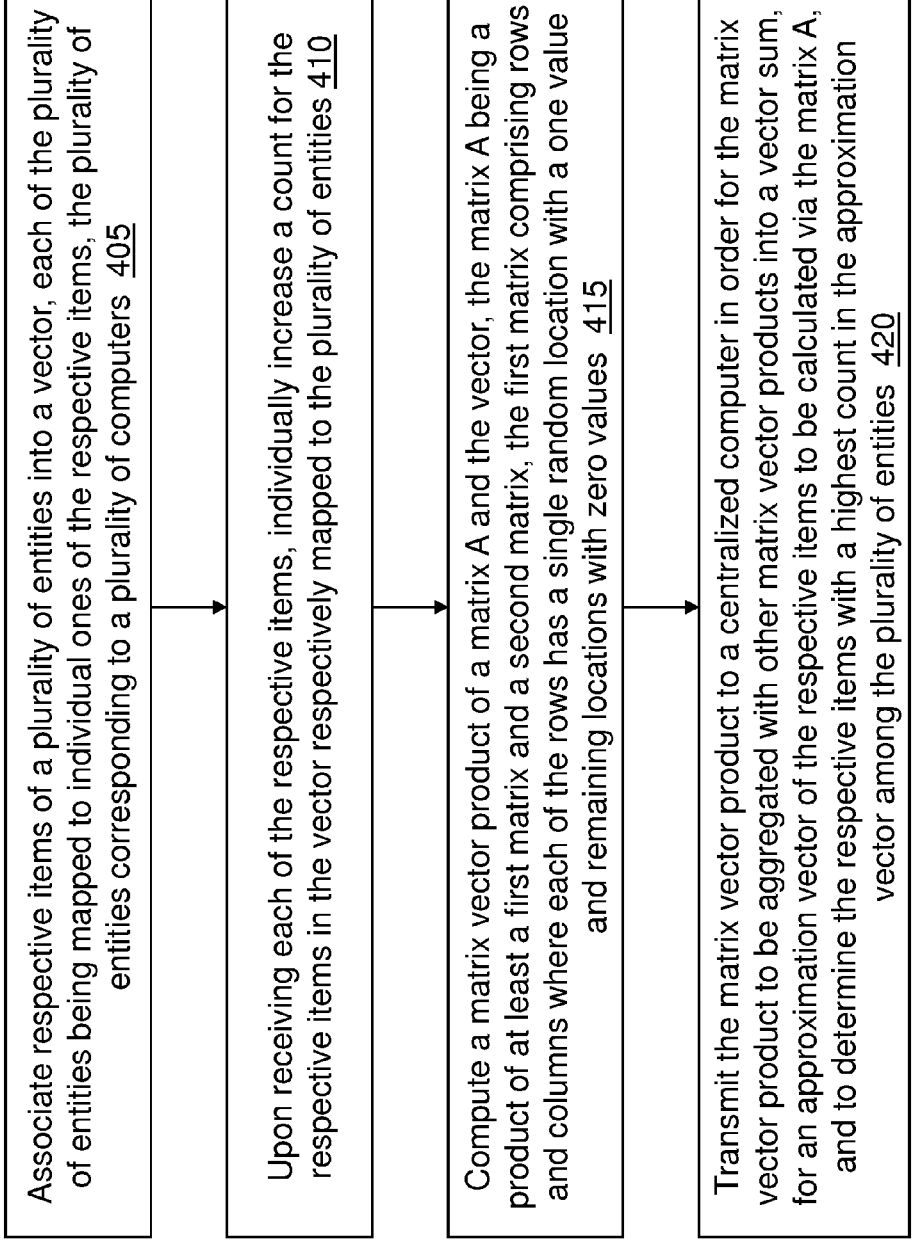

FAST DISTRIBUTED DATABASE FREQUENCY SUMMARIZATION

CROSS REFERENCE TO RELATED APPLICATIONS

The present application is a continuation of U.S. patent application Ser. No. 13/790,098, entitled "FAST DISTRIBUTED DATABASE FREQUENCY SUMMARIZATION", filed on Mar. 8, 2013, which is incorporated herein by reference in its entirety.

BACKGROUND

The present disclosure relates to database frequency summarization, and more specifically, to techniques for summarizing the frequency of particular data among computers.

Data mining, a field at the intersection of computer science and statistics, is the process that attempts to discover patterns in large data sets. It utilizes methods at the intersection of artificial intelligence, machine learning, statistics, and database systems. The overall goal of the data mining process is to extract information from a data set and transform it into an understandable structure for further use. Aside from the raw analysis step, it involves database and data management aspects, data preprocessing, model and inference considerations, metrics, complexity considerations, post-processing of discovered structures, visualization, and online updating.

The actual data mining task is the automatic or semi-automatic analysis of large quantities of data to extract previously unknown interesting patterns such as groups of data records (cluster analysis), unusual records (anomaly detection), and dependencies (association rule mining), etc. This usually involves using database techniques such as spatial indexes. These patterns can then be seen as a kind of summary of the input data, and may be used in further analysis, or for example, in machine learning and predictive analytics.

SUMMARY

According to an embodiment, an apparatus having a processor and memory is provided for computing a frequency of packets in network devices. Respective packets of entities are associated in a vector, where each of the entities is mapped to corresponding ones of the respective packets, and the entities correspond to computers. Upon at least one network device receiving the respective packets, a count is individually increased for the respective packets in the vector respectively mapped to the entities, and computing a matrix vector product of a matrix A and the vector. The matrix A is a product of at least a first matrix and a second matrix. The first matrix includes rows and columns where each of the rows has a single random location with a one value and remaining locations with zero values. The matrix vector product is transmitted to a centralized computer for aggregating with other matrix vector products.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 illustrates an example of the matrix A according to an embodiment.

FIGS. 4A and 4B illustrate a method of computing a frequency of an item according to an embodiment.

DETAILED DESCRIPTION

The present disclosure provides a technique to collect data (for a particular entity) from various computers (such as servers, routers, etc.) and summarize the data for a particular entity at a centralized server. Various examples are provided below for explanation purposes and not limitation.

Figure 1:
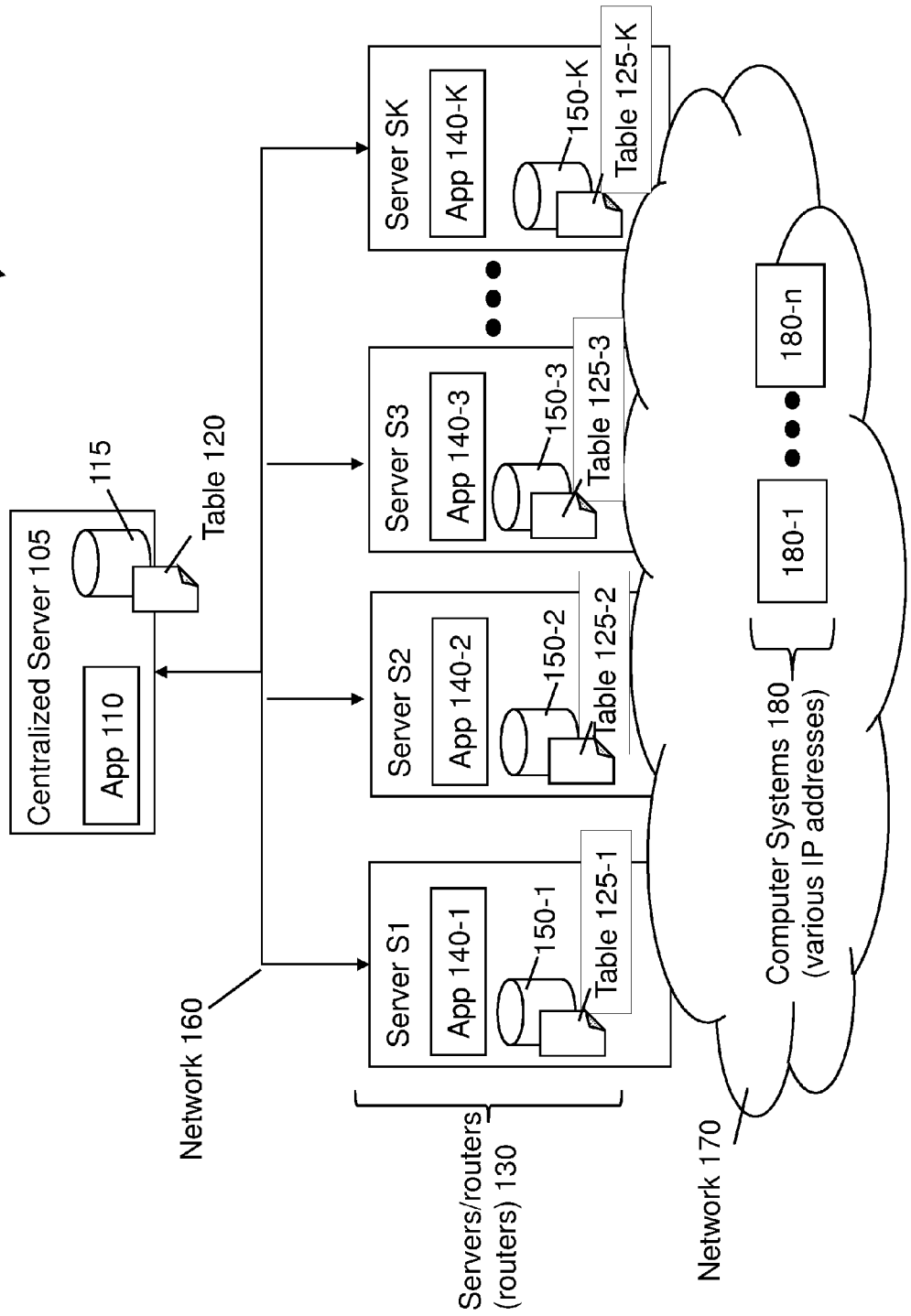
FIG. 1 is a system for database frequency summarization according to an embodiment.

FIG. 1 is a system 100 for database frequency summarization according to an embodiment. A centralized server 105 is connected to servers (routers) 130, which are identified as servers S1 through SK. The servers/routers 130 are computing devices that represent any type of network devices transmitting and receiving Internet protocol packets. For example, the network devices may be servers, routers, hubs, etc. The centralized server 105 may be connected to the various servers 130 through a network 160. Each server 130 may be connected to and/or part of other networks 170. The servers 130 may be (and/or operate as) routers, hubs, etc., which pass and direct Internet Protocol (IP) traffic to and from other computer systems 180 (such as computer systems of users and computer systems of websites) operating over the network 170. The computer systems 180 as identified as computer system 180-1 through 180-$n$, each with its own IP address.

Each server 130 has its own database 150 (identified as databases 150-1 through 150-K). Each database 150 stores data about Internet Protocol (IP) traffic flowing through the respective server/router 130. Each server 130 has it own software application 140 (e.g., software applications 140-1 through 140-K) to identify and summarize IP traffic from a particular computer system 180 (for an entity) out of the large amount of IP traffic (data) stored for all computer systems 180 (e.g., for all entities) with traffic flowing through the respective servers 130. For explanation purposes, each entity corresponds to and/or has its own computer system 180 (but it is understood that an entity may have more than one computer system 180). The software application 140 is configured with an algorithm to (quickly) determine IP traffic for a particular computer system 180 (such as the entity Google®) out of all of the IP traffic for many computer systems 180 (entities). The software application 140 (individually) determines the respective amount of IP traffic for each computer system 180 (entity) (e.g., the first entity (computer system 180-1) through the last entity (computer system 180-$n$)), and each server 130 sends the individual amount of individual IP traffic corresponding to each of the different entity (computer systems 180-1 through 180-$n$) to the centralized server 105. The software application 110 of the centralized server 105 is configured with an algorithm that combines the respective IP traffic per entity (i.e., per compute system 180) from each of the servers 130 (i.e., from each server S1 through SK) based on the respective IP address of each computer system 180 (entity), and the software application 110 determines which computer systems 180 (entities) have the largest amount of IP traffic (as a whole) flowing through (each and) all of the servers 130. The software application 110 determines that entities (which may hosted on one or more computer systems 180) generating (i.e., transmitting and/or receiving) the highest IP traffic are the "heavy hitters" among the servers 130.

The centralized server 105, the servers 130, and the computer systems 180 comprises all of the necessary hardware and software to operate as discussed herein, as understood by one skilled in the art, which includes one or more processors, memory (e.g., hard disks, solid state memory, etc.), busses, input/output devices, etc.

An example scenario is now provided for explanation purposes and not limitation. Suppose there are K=10 routers/servers 130, resulting in server S1 through server S10. Each router/server 130 collects IP packets flowing through it. Each IP packet has a source and a destination IP address. The centralized server 105 is configured (with software application 110) to determine which destination IP addresses (e.g., belonging to a computer system 180 for a particular website of an entity) have a large number of IP packets being sent to it (e.g., on any of the computer systems 180-1 through 190-$n$ on the network 170). In addition, for each such destination IP address, the centralized server 105 is configured to estimate the total number of IP packets on the network 170 (i.e., flowing through the network 170). If the total number of IP packets are large, the centralized server 105 may decide to place more routers/servers 130 on the network 170 (and/or dedicated routers/servers 130) to handle the destination IP addresses of the computer systems 180 (i.e., heavy hitters) with a large number of IP packets being set to them.

Suppose there are $n=10^9$ destination IP addresses (corresponding to the computer systems 180) that the centralized server 105 is monitoring (these IP addresses may be stored in the database 115). Let h be a labeling function which takes a destination IP address, such as that for Google®, and maps the destination IP address (for Google®) to a unique number between 1 and n. Denote the k=10 routers $S^1, S^2, \ldots, S^{10}$. Let eps=10%=0.1, and m=(1/eps)$^2$*log_10 n=100*9=900. Note that eps stands for epsilon ($\epsilon$), and denotes an accuracy parameter. For example, the method will find all computer systems 180 sending at least an epsilon fraction of the total amount of traffic. Let A be an m×n JL (Johnson-Lindenstrauss) matrix. Each of the k routers/servers 130 knows and stores both h and A in their respective databases 150, along with the centralized server 105 which stores both h and A in the database 115. The labeling function h is a mapping table stored in the servers 130 and the centralized server 105. The mapping table identifies each destination IP address (and source IP address) from the IP packet header with its corresponding particular computer system 180 in the network 170 and its corresponding entity (such as Google®).

Figure 3A:
FIG. 3A illustrates a packet monitoring phase according to an embodiment.

In FIG. 3A, the following procedure is performed by the routers/servers 130 during the IP packet monitoring phase 301 (i.e., real-time monitoring and/or near real time monitoring of IP packets flowing in and out of the network 170). For each i, the i-th router/server $S^i$ executes the following (e.g., each server 130 respectively executes the following via software application 140):

At block 302, the server/router 130 initializes a vector $x^i$ of length n to all zeros. The vector $x^i$ is a vector that includes (and/or will include) the total IP packets monitored by the server/router 130 during the monitoring phase.

At block 304, upon receiving an IP packet with a certain destination IP address, such as that for Google® (or other entities), the router/server 130 applies the labeling function h to Google® to obtain a number j between 1 and n. The router/server 130 then replaces the j-th coordinate of $x^i$, denoted $x^i_j$, with the value $x^i_{j+1}$. On the vector $x^i$, j is a coordinate on the vector $x^i$, and Google is designated as the j-th coordinate on the vector $x^i$. Each time an IP packet arrives with the destination IP address for Google®, the router/server 130 increases the counter at the j-th coordinate ($x^i_j$) to the value $x^i_{j+1}$ upon receiving each IP packet mapped to Google® in the mapping table of the database 150. Each vector $x^i$ calculated by each respective router/server 130 may be referred to as a sketch.

Figure 3B:
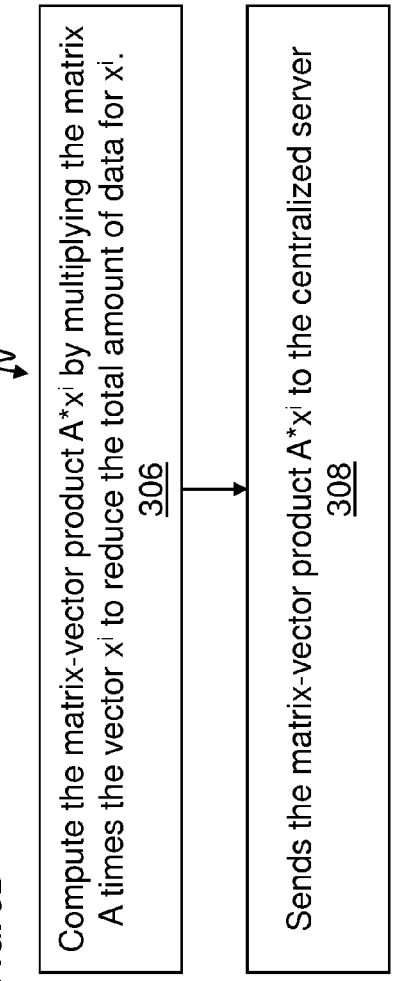
FIG. 3B illustrates a packet-collection phase according to an embodiment.

After receiving all IP packets during the packet monitoring phase, for each i, the i-th router $S^i$ executes the following in the IP packet-collection phase 305 (e.g., via software application 140) in FIG. 3B.

Figure 2:
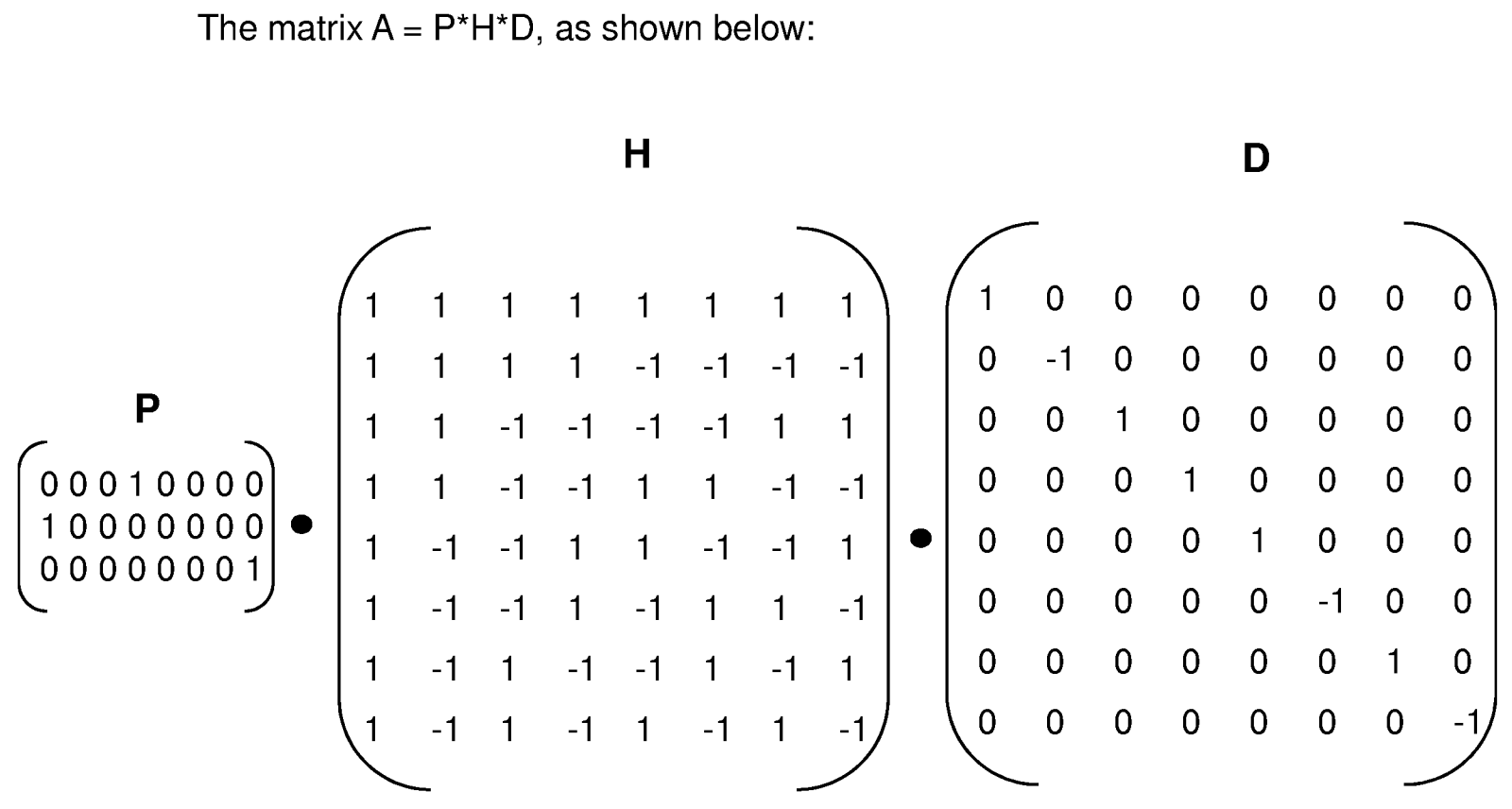

At block 306, the router/server 130 computes the matrix-vector product $A*x^i$. The router/server multiplies the matrix A times the vector $x^i$ to reduce the total amount of data for $x^i$. As noted above the matrix A is predefined and stored in memory of the servers 130 (and the centralized server 105), and $x^i$ is individually calculated/monitored by each respective router/server 130. According to an embodiment, FIG. 2 illustrates an example of the matrix A utilized herein. The matrix A is a Fast-Johnson Lindenstrauss Transform (FJLT) with, e.g., m=3 and n=8. This FJLT is the product of three matrices where matrix A=P*H*D.

In FIG. 2, the matrix P is a 3 by 8 matrix. In matrix P, row 1 has all "0s" and a single "1", row 2 has all "0s" and a single "1", and row 3 has all "0s" and a single "1". The location of each "1" in rows 1, 2, and 3 is randomly selected in each particular row (as predefined and known by each router/server 130 and centralized server 105), while the remaining entries in each row 1, 2, and 3 are "0s".

In FIG. 2, the matrix H is an 8 by 8 matrix, in which each entry is either a "1" or "−1" (i.e., no "0"). The matrix H is a well-structured matrix. For the matrix H, one can say that the entry in the i-th row and j-th column is determined by writing i in its binary representation. For example, if i=17, then 10001 is the binary representation of i=17. If j=21, then 10101 is the binary representation of j=21. Then if the number of positions that are 1 in both the binary representation of i and j is even, then the corresponding entry of H is 1. If the number of positions that are 1 in both the binary representations of i and j is odd, then the corresponding entry of H is −1. In the example (of FIG. 2), the matrix H has 10001 and 10101 as the binary representations of i and j, respectively. The first position is 1 in both representations. Also, the last position is 1 in both binary representations. As these are the only positions which are 1 in both binary representations, the total number of such positions is 2, which is even. Therefore, the entry in the i-th row of H and j-th column is equal to 1.

The matrix D is also an 8 by 8 matrix. In matrix D, the main diagonal is either "1" or "−1", while the other entries are "0".

At block 308, the router/server 130 sends the matrix-vector product $A*x^i$ to the centralized server 105. That is, the router/server multiplies the matrix A times the vector $x^i$ (which is the total collection of destination IP addresses for each entity), to result in a reduced amount of data based on the structure of the matrix A.

Figure 3C:
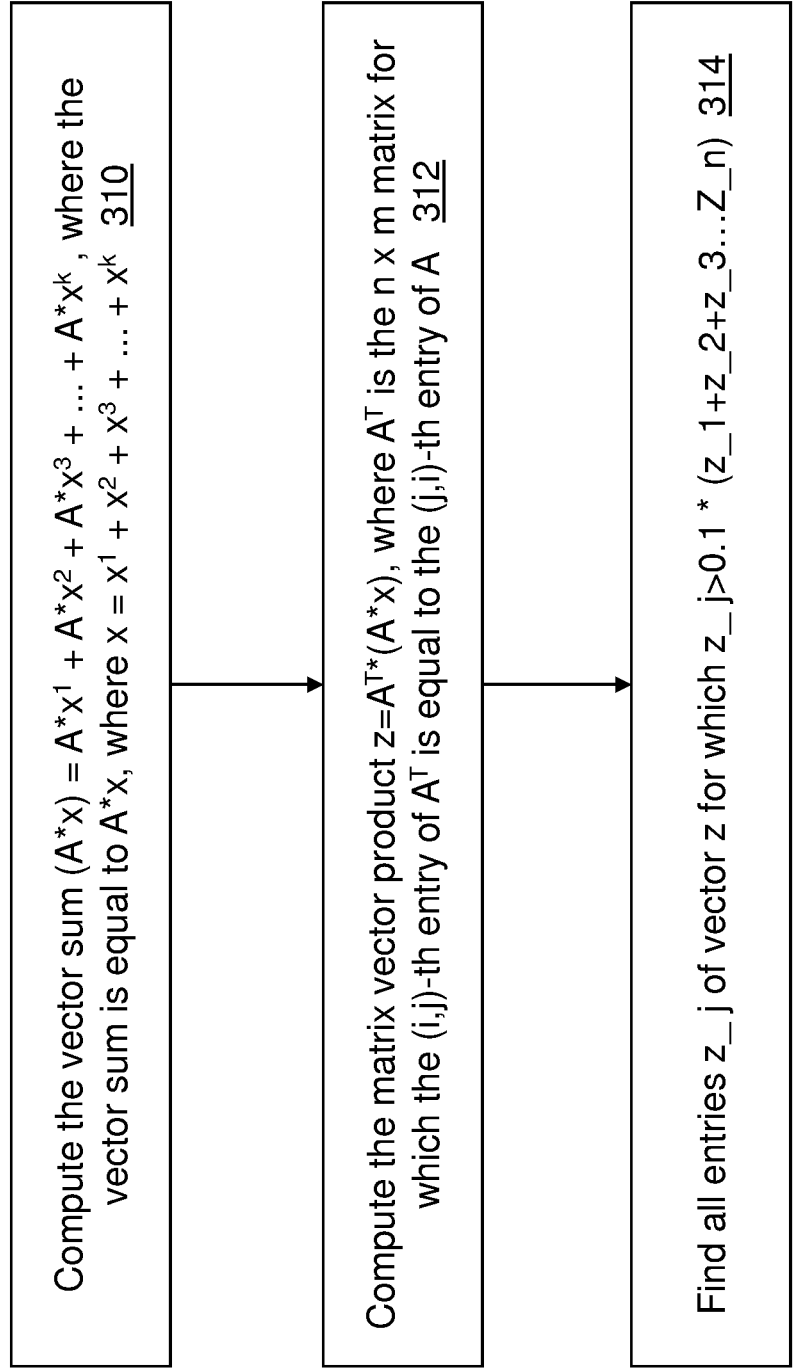
FIG. 3C illustrates a packet-aggregation phase according to an embodiment.

Upon collecting the matrix-vector products $A*x^i$ for each i (which represents an individual router/server 130), the centralized server 105 executes (e.g., via software application 110) the following in the IP packet-aggregation phase 309 in FIG. 3C (also referred to as the output procedure Out herein):

At block 310, the centralized server 105 computes the vector sum $(A*x)=A*x^1+A*x^2+A*x^3+\ldots+A*x^k$. (Note that each router/server 130 ($S^i$) computes its own $x^i$ and then computes its own $A*x^i$ as discussed above.) This vector sum is equal to $A*x$, where $x=x^1+x^2+x^3+\ldots+x^k$. Here, if h("Google®")=j, then the j-th coordinate x_j of x denotes the total number of IP packets whose destination IP address was that of Google®. Similarly, if h("Ebay®")=k, then the k-th coordinate x_k of x denotes the total number of packets whose destination IP address was that of Ebay®. This mapping of destination IP addresses continues for other entities in the mapping table of the databases 115 and 150.

At block 312, the centralized server 105 computes the matrix vector product $z=A^T*(A*x)$, where $A^T$ is the n×m matrix for which the (i,j)-th entry of $A^T$ is equal to the (j,i)-th entry of A. In other words, the entry at the i-th row and j-th column of the matrix $A^T$ (A transpose) is equal to the value of the entry at the j-th column and i-th row of the matrix A. Also, z is a vector (too), and ideally the vector z would be equal to the vector x, but vector z is an approximation of vector x based on the (uniqueness) matrix A. Vector $z=z^1+z^2+z^3+\ldots+z^k$ which is approximates (but ideally equals) vector $x=x^1+x^2+x^3+\ldots+x^k$. By multiplying the transpose ($A^T$) of A by the vector sum (A*x), the centralized server 105 is configured to extract out the vector x (or rather the vector z that approximates the vector x) without requiring each router/server 130 to send its entire vector xi to the centralized server 105. Instead, each router/server 130 sends its shorten vector $A*x^i$ instead of its full length vector $x^i$ to the centralized server 105.

At block 314, the centralized server 105 finds all entries z_j of vector z for which z_j>0.1*(z_1+z_2+z_3 . . . Z_n). For each such entry z_j, the centralized server 105 is configured to find the source destination IP address s for which h(s)=j. For instance, if h("Google®")=j, then Google® would be one such source/destination IP address. The centralized server reports all such destination IP addresses to the k routers/servers. The identified destination addresses (and/or source IP address) have the highest/largest amount of IP packets flowing through (in and/or out) the combined routers/servers 130. The centralized server 105 sends the identified destination addresses having the highest amount of IP packets to all of the servers/routers 130. When the centralized server 105 finds all entries z_j of vector z for which z_j>0.1*(z_1+z_2+z_3 . . . z_n), this means for example: 1) There is the vector z, which has n entries. 2) The centralized server 105 then adds (i.e., sums) up all n entries, obtaining z_1+z_2+ . . . +z_n, and calls this S for "sum". 3) The centralized server 105 finds those entries j of z for which z_j>0.1*S. The centralized server 105 first computes S, tries each j=1, . . . , n, and checks if z_j>0.1*S.

One of the differences between the embodiment disclosed herein and state of the art systems is the selection/choice of the matrix A in the initialization phase (by the servers/routers 130), and the corresponding block 312 performed by the centralized server 105. If, for example, the state of the art system were to utilize a matrix B (which is not a JL matrix) of the same m×n dimensions (i.e., same dimensions of matrix A) for which computing $A*x^i$ for a vector $x^i$ took time $m*n=900*10^9$, where m=900 and $n=10^9$. However, when using the JL matrix A (of the embodiment) instead, the time to compute $A*x^i$ is $n*\log\_10\, m=10^9*\log\_10\, 900$ which is less than $<10^9*900$ (of the state of the art), and thus the embodiment is significantly faster to compute.

Thus the embodiment results in significantly faster time in block 306 of the packet-collection phase (by the servers 130), while having the same amount of communication in block 308 of the packet-collection phase (by the servers 130).

Figure 4B:
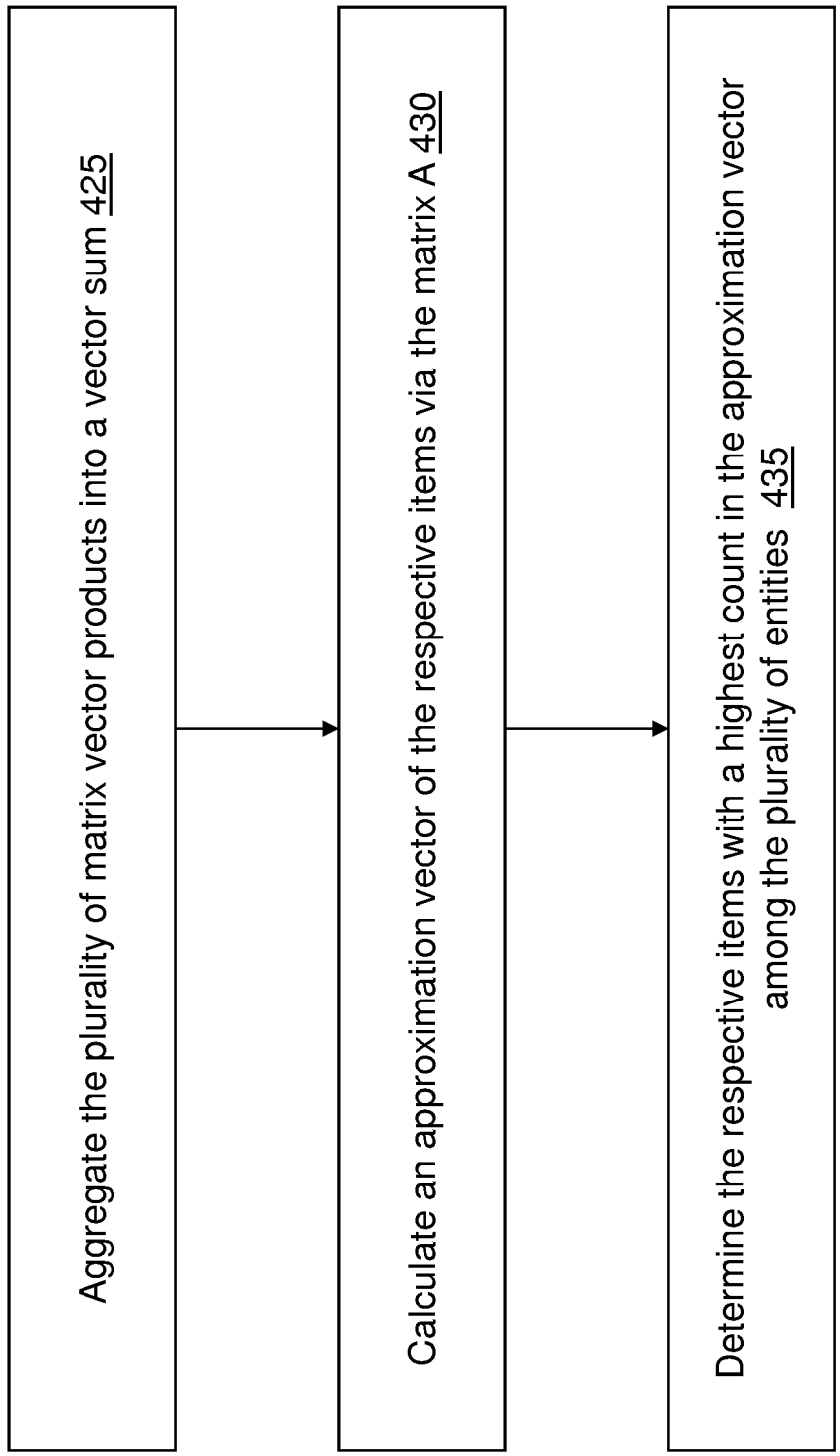

FIGS. 3 and 4 illustrate a method 300 of computing a frequency of one or more items (such as packets with a destination IP address, source IP address, etc.) in the servers/routers 130 (generally referred to as network devices) according to an embodiment.

At block 305, the network devices (i.e., servers 130) are each configured (via the software application 140) to associate respective items of a plurality of entities (e.g., such as Google®, Ebay®, Amazon®, and others) into a vector (e.g., vector $x^i$), where each of the plurality of entities are respectively mapped to individual ones of the respective items and where the plurality of entities correspond to the plurality of computers (e.g., respectively hosted on the computer systems 180). For example, each entity is mapped to its own IP destination address (or source IP address) in the respective tables 125.

At block 310, upon the network devices (servers 130) receiving each of the respective items, the network devices (servers 130) are configured to individually increase a count for the respective items (the particular destination IP address) in the vector (vector $x^i$) respectively mapped to the plurality of entities.

At block 315, the network devices (servers 130) are configured to each compute its own matrix vector product of a matrix A and the vector (i.e., its respective vector $v^i$), where the matrix A is a product of at least a first matrix (e.g., matrix P) and a second matrix (e.g., matrix D), and where the first matrix (matrix P) comprises rows and columns where each of the rows has a single random location with a one value and remaining locations with zero values.

At block 320, each of the network devices (servers 130) are configured to transmit their respective matrix vector products ($A*x^i$) to a centralized computer, i.e., the centralized severs 105.

At block 325, after receiving the matrix vector products ($A*x^1, A*x^2, A*x^3, \ldots A*x^k$) from each of the network devices, the centralized sever 105 is configured to aggregate the received matrix vector products with other matrix vector products into a vector sum (e.g., the vector sum $A*x=A*x^1+A*x^2+A*x^3+\ldots+A*x^k$, where $x=x^1+x^2+x^3+\ldots+x^k$).

At block 330, the centralized server 105 is configured to calculate an approximation total vector (vector z) of the respective items via the matrix A. For example, the approximation total vector is the matrix vector product $z=A^T*(A*x)$ computed by the centralized server 105.

At block 335, the centralized server 105 is configured to determine the respective items (e.g., the one or more destination IP addresses and/or source IP addresses) with a highest count in the approximation vector among the plurality of entities. For example, the centralized server 105 finds each z_j with the highest count of destination IP addresses for corresponding entities.

In the method, the second matrix (matrix D) has a main diagonal with one values and negative one values, and other locations, not on the main diagonal, in the second matrix are zero values. In the matrix D, the one values and the negative one values on the main diagonal are randomly located on the main diagonal.

The columns of the first matrix (matrix P) comprise a first column through a last column, and the single random location with the one value in each of the rows of the first matrix is a random selection in any one of the first column through the last column of the first matrix, for each row.

In the method, the matrix A is identical for the network devices (the servers/routers 130). The matrix A is identical for the network devices (the servers/routers 130) and the centralized server 105. Additionally, the matrix A is a product of the first matrix, the second matrix, and a third matrix (e.g., the matrix H). The third matrix (the matrix H) is a combination of only one values and negative one values.

Coordinates of the vector (e.g., vector $x=x^1+x^2+x^3+\ldots+x^k$) and the approximation vector (vector $z=z^1+z^2+z^3+\ldots+z^k$) are identical such that each has identical ones of the plurality of entities mapped at corresponding coordinates. For example, if the first coordinate on vector x is the total amount of IP packets for Google®, then the first coordinate on the approximation vector z is also the (approximate) total amount of IP packets for Google®. If the second coordinate on vector x is the total amount of IP packets for Ebay®, then the second coordinate on the approximation vector z is also the (approximate) total amount of IP packets for Ebay®. This same process follows by analogy for each coordinate of vector x to each coordinate for vector z, through the last coordinate. The centralized server 105 is configured to select the coordinates with the highest IP packet count.

Detailed descriptions and mathematical development of the algorithm of the software application 140 and the software application 110 are discussed below. Although specific details are discussed and subtitles are provided for ease of understanding, these are for explanation purposes but not limitation.

Given a parameter $\epsilon>0$, the point query problem asks to design an m×n matrix A so that for all $x \in \Re^n$, from Ax there can be output a vector x' for which $\|x'-x\|_\infty = \max_{i \in [n]} |x'-x| \le \epsilon \|x\|_1$. There are several goals which include (1) minimize m, as a function of n and $1/\epsilon$, and (2) minimize the time for computing the sketch Ax given x.

The present disclosure provides a new construction of matrices A for which $m=O((\log n)/\epsilon^2)$ and particularly, the time to compute Ax is only $O(n(\log(1/\epsilon)+\log \log n))$. This improves all previous schemes, which had time complexity at least $\Omega((n \log n)/\epsilon)$ to compute the sketch. O means to multiply by a fixed constant, and O may be a fixed constant such as 2 or 3. For example, for a number t, O(t) denotes a quantity for which there is a fixed constant C (which could be 2 or 3) for which the quantity is less than C*t. Similarly, for a number t, $\Omega(t)$ denotes a quantity for which there is a fixed constant C (which could be 2 or 3) for which the quantity is at least C*t.

Moreover, a stronger error guarantee of $\|x'-x\|_\infty \le \epsilon \|x_{tail(1/\epsilon^2)}\|_1$ is achieved, where $x_{tail(k)}$ denotes $x$ with the top $k$ coordinates in magnitude removed. The construction can be generalized to obtain matrices A with $m=O(k \log(n/k)+(\log n)/\epsilon^2)$, for $k \le n^{1/2-\alpha}$ for an arbitrarily small constant $\alpha>0$, the time to compute Ax is $O(n(\log 1/\epsilon+\log \log n))$, and the output x' satisfies $\|x'-x\|_\infty \le \epsilon \|x_{tail(k)}\|_1$.

I. Application of an Embodiment

Consider k servers $S^1, \ldots, S^k$, each holding a database $D^1, \ldots, D^k$, respectively. The servers (i.e., servers/router 130) want to compute statistics of the union D of the k databases. For instance, the servers may want to know the frequency of a record or attribute-pair in D. It is too expensive for the servers to communicate their individual databases to the centralized server (i.e., the centralized server 105), or to compute the frequency exactly. Hence, the servers wish to communicate a short summary or "sketch" of their databases to the centralized server, which can then combine the sketches to answer frequency queries about D.

The databases are modeled as vectors $x^i \in \Re^n$. To compute a sketch of $x^i$, Ax for a matrix A is computed with m rows and n columns. Importantly, m<<n, and so $Ax^i$ is much easier to communicate than $x^i$. The servers (i.e., servers 130) compute $Ax^i, \ldots, Ax^k$, respectively, and transmit these to a centralized server. Since A is a linear map, the centralized server can compute Ax for $x=c_1 x^1+\ldots c_k x^k$ for any real numbers $c_1, \ldots, c_k$. Notice that the $c_i$ are allowed to be both positive and negative, which is important for estimating the frequency of record or attribute-pairs in the difference of two datasets, which allows for tracking which items have experienced a sudden growth or decline in frequency. This is also useful for maintaining the set of frequent items over a changing database relation.

Associated with A is an output algorithm Out which given Ax, outputs a vector x' for which $\|x'-x\|_\infty \le \epsilon \|x_{tail(k)}\|_1$ for some number k, where $x_{tail(k)}$ denotes the vector x with the top k entries replaced with 0 (the other entries being unchanged). Thus x' approximates x on every coordinate. The pair (A, Out) is called a solution to the point query problem. Given such a matrix A and an output algorithm Out, the centralized server can obtain an approximation to the value of every entry in x, which depending on the application, could be the frequency of an attribute-pair. It can also, e.g., extract the maximum frequencies of x, which are useful for obtaining the most frequent items. The centralized server obtains an entire histogram of values of coordinates in x, which is a useful low-memory representation of x. Notice that the communication is mk words, as opposed to nk if the servers were to transmit $x^1, \ldots, x^n$. Note that the output algorithm Out computes vector $x'=A^T*z$, where $A^T$ is the matrix whose entry in the i-th row and j-th column, for each i and j, is the same entry in the i-th column and j-th row of A (that is, rows and columns are swapped).

II. Example Results

The present disclosures shows how to build a matrix A where m is only $O(\log n = \epsilon^2)$, and moreover, the time for each server to compute $Ax^i$ is $O(n(\log 1/\epsilon+\log \log n))$, which is almost the same amount of time just to read the entries in $x^i$. This improves upon previous schemes with the same value of m, which required $O((n \log n)/\epsilon)$ time to compute $Ax^i$. Moreover, our error is $\epsilon \|x_{tail(1/\epsilon^2)}\|_1$, which improves previous error estimates (of the state of the art) which at best had the form $\epsilon \|x_{tail(1/\epsilon)}\|_1$.

The construction can be generalized to obtain matrices A with $m=O(k \log(n/k)+(\log n)/\epsilon^2)$, for $k \le n^{1/2-\alpha}$ for an arbitrarily small constant $\alpha>0$, the time to compute Ax is $O(n(\log 1/\epsilon+\log(\log n)))$, and the output x' satisfies $\|x'-x\|_\infty \le \epsilon \|x_{tail(k)}\|_1$.

Notice that the correctness guarantee holds for all input vectors $x \in \Re^n$ simultaneously, and thus the correctness guarantee is stronger (than the state of the art) and should be contrasted with the guarantee that the algorithm succeeds given Ax with high probability for a fixed x. The latter guarantee is achieved by the CountSketch algorithm. One of the reasons the latter guarantee is less useful is because of adaptive queries. That is, suppose the centralized server computes x' and transmits information about x' to $S^1, \ldots, S^k$. Since x' could depend on A, if the servers were to then use the same matrix A to compute sketches $Ay^1, \ldots, Ay^k$ for databases $y^1, \ldots, y^k$ which depend on x', then A need not succeed, since it is not guaranteed to be correct with high probability for inputs $y^i$ which depend on A.

III. Example Implementation of the Algorithm

The first key observation is that any Johnson-Lindenstrauss matrix (JL matrix for short) A has a correct associated output procedure Out. By JL matrix, this means an $O(\log n/\epsilon^2)*n$ matrix A for which all columns $A^i$ of A, there is $\|A_i\|_2^2=1\pm\epsilon$, and for all pairs of columns $i\neq j$, there is $\langle A_i, A_j\rangle\leq\epsilon$. It is assumed that for all columns $A_i$, there is in fact $\|A_i\|_2^2=1$. This can be achieved by multiplying each column by a number in the interval $[1-\epsilon, 1+\epsilon]$. After doing this, there still is the property that $\langle A_i, A_j\rangle=O(\epsilon)$ for all $i\neq j$. Now, the following lemma is presented.

Lemma 1: Any JL matrix A has a recovery procedure Out for which (A, Out) is a solution to the point query problem. In fact, for any $x\in\Re^n$, given Ax and $i\in[n]$, the output $x'_i$ satisfies $\|x'_i-x_i\|\leq\epsilon\|x_{-i}\|_1$, where $x_{-i}$ is the vector x with the i-th coordinate replaced with 0.

Proof: Let $x\in\Re^n$ be arbitrary. Given Ax, algorithm Out sets $x'=A^T Ax$. Observe that for any $i\in[n]$, there is $$x'_i = A_i^T Ax = \sum_{j=1}^{n} \langle A_i, A_j\rangle x_j = x_i + O(\varepsilon)\|x_{-i}\|_1,$$

and therefore $\|x'-x\|_\infty\leq\epsilon\|x_{-i}\|_1$, as needed.

It is to be understood that any JL matrix has $m=\Omega((\log n)/(\epsilon^2 \log 1/\epsilon))$, and there are constructions JL matrices achieving $m=O((\log n)/\epsilon^2)$, e.g., an m×n matrix of random entries $\{-1/\sqrt{m}, 1/\sqrt{m}\}$.

A particular family of JL matrices is exploited due to Ailon and Liberty. Ailon and Liberty provide a distribution ρ on $O((\log n)/\epsilon^2)\times n$ matrices A for which $A\sim\rho$, then with high probability, A is a JL matrix. Moreover, the time to compute Ax is only $O(n(\log 1/\epsilon+\log(\log n)))$. Here Ailon and Liberty make the mild assumption that $1/\epsilon^2<n^{1/2-\alpha}$ for an arbitrarily small constant $\alpha>0$. This is fine in applications provided that $\epsilon$ is not too small.

Given that A is a JL matrix, by Lemma 1, (A, Out) satisfies that for all $x\in\Re^n$, algorithm Out succeeds in outputting x' given Ax for which $\|x'-x\|_\infty\leq\epsilon\|x_{-i}\|_1$. Given the JL matrices, a solution to the point query problem is provided in which the output x' satisfies $\|x'-x\|_\infty\leq\epsilon\|x_{-i}\|_1$ with $m=O((\log n)/\epsilon^2)$ and $O(n(\log 1/\epsilon+\log(\log n)))$ time to compute Ax. Our next step is to improve the error guarantee of $\|x'-x\|_\infty\leq\epsilon\|x\|_1$ to the stronger guarantee $\|x'-x\|_\infty\leq\epsilon\|x_{tail(1/\epsilon^2)}\|_1$.

A second idea is to in parallel run a k-sparse recovery algorithm which has the following guarantee: for our second idea is to, in parallel, run a k-sparse recovery algorithm which has the following guarantee: for any $x\in\Re^n$, given Bx for a certain matrix B, there is an associated output procedure Out' which outputs a vector $x'\in\Re^n$ for which $\|x'-x\|_1\leq O(1/\sqrt{k})\|x_{tail(k)}\|_2$. It is known that any such x' also satisfies the guarantee that $\|x'-x\|_1\leq O(1)\|x_{tail(k)}\|_1$. Moreover, it is known that if B is a matrix for which for all k-sparse vectors x, $\|Bx\|_2=(1\pm\epsilon)\|x\|_2$, then B has an associated output procedure Out' satisfying the above guarantee, which given Ax, outputs $\text{argmin}_{z|Ax=Az}\|z\|_1$ by solving a linear program. Finally, it is known that a random matrix $A\sim\rho$ for the distribution ρ (mentioned above), with $m=O((\log n)/\epsilon^2)$, is also a $1/\epsilon^2$-sparse recovery matrix with high probability, provided again that $1/\epsilon^2<n^{1/2-\alpha}$ for an arbitrarily small constant $\alpha>0$.

Theorem 2: Suppose k, $1/\epsilon^2<n^{1/2-\alpha}$ for any arbitrarily small constant $\alpha>0$. There is an m×n matrix A and associated output procedure Out which for any $x\in\Re^n$, given Ax, outputs a vector x' with $\|x'-x\|_\infty\leq\epsilon\|x_{tail(k)}\|_1$. Here $m=O(k \log(n/k)+(\log n)/\epsilon^2)$, and the time to compute Ax is $O(n(\log 1/\epsilon+\log\log n))$.

Proof: Our m×n matrix A is drawn from distribution of ρ, where ρ is as described above. Then $m=O(k (\log n/k)+(\log n)/\epsilon^2)$ and Ax can be computed in $O(n(\log 1/\epsilon+\log \log n))$ time. Given Ax, one can first run the k-sparse recovery algorithm to obtain a vector y with $\|x-y\|_1=O(1)\|x_{tail(k)}\|_1$.

The output vector x' is constructed coordinate by coordinate. To construct $x_i'$, one then replaces $y_i$ with 0 to obtain the vector z. Then one computes A (x−z) and runs the point query output procedure associated with A and index i. The guarantee is that the output w of the point query algorithm satisfies $|w_i-(x-z)_i|\leq\epsilon\|(x-z)_{-i}\|_1$, where $$\|(x-z)_{-i}\|_1=\|(x-y)_{-i}\|_1\leq\|x-y\|_1=O(1)\|x_{tail(k)}\|_1,$$

and so $|(w+z)_i-x_i|=O(\epsilon)\|x_{tail(k)}\|_1$. The output vector x' is defined to be w+z and rescale $\epsilon$ by a constant factor, this proves the theorem.

By setting $k=1/\epsilon^2$ in Theorem 2, the following is obtained.

Corollary 3: Suppose $1/\epsilon^2<n^{1/2-\alpha}$ for any arbitrarily small constant $\alpha>0$. There is an m×n matrix A and associated output procedure Out which for any $x\in\Re^n$, given Ax, outputs a vector x' with $\|x'-x\|_\infty\leq\epsilon\|x_{tail(1/\epsilon^2)}\|_1$. Here $m=O(k \log(n/k)+(\log n)/\epsilon^2)$, and the time to compute Ax is $O(n(\log 1/\epsilon+\log \log n))$.

Figure 5:
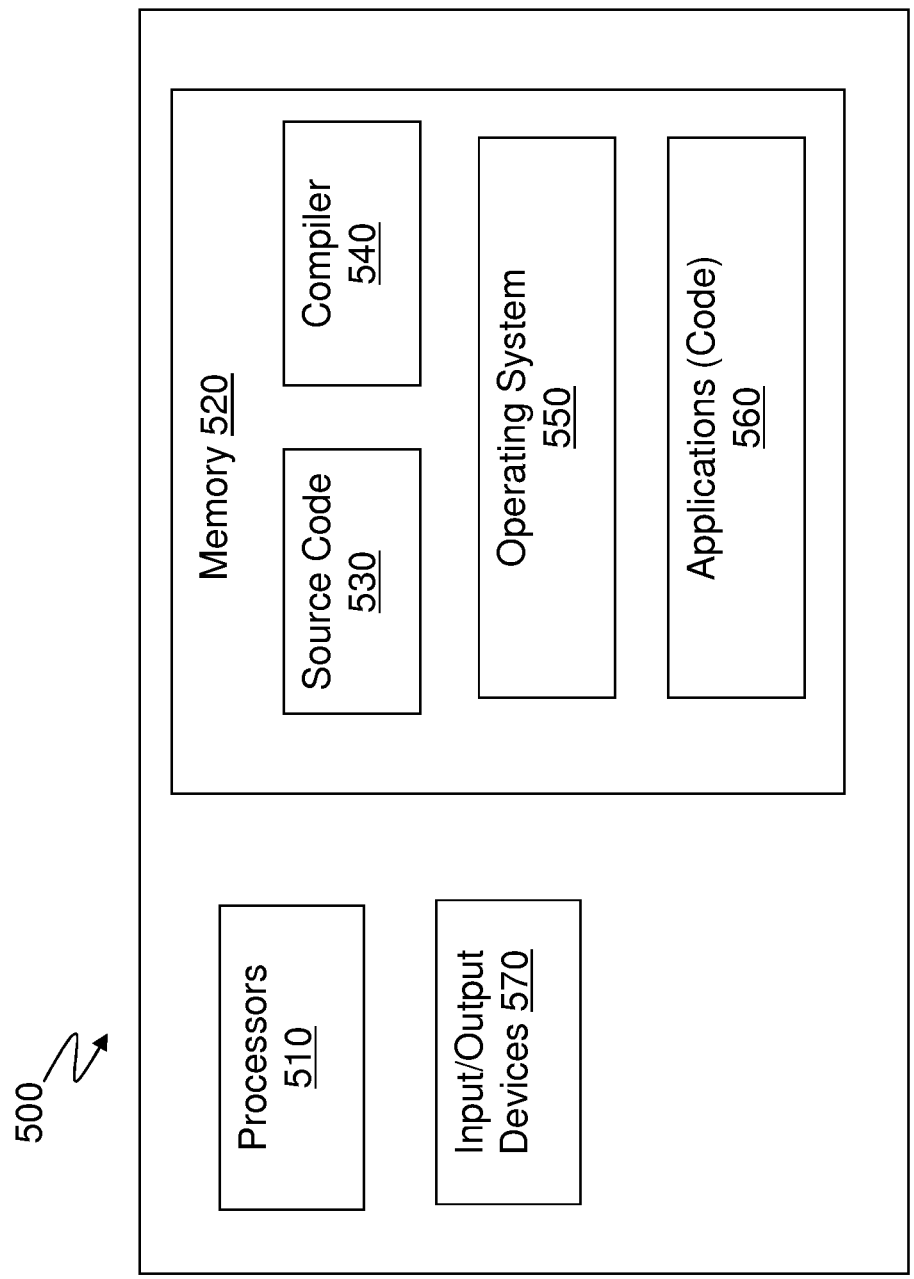
FIG. 5 is a block diagram that illustrates an example of a computer (computer setup) having capabilities, which may be included in and/or combined with embodiments.

Now turning to FIG. 5, an example illustrates a computer 500 (e.g., any type of computer system discussed herein including centralized server 105, network devices (i.e., servers/routers 130), computer systems 180 (hosting various entities), etc.) that may implement features discussed herein. The computer 500 may be a distributed computer system over more than one computer. For example, various methods, procedures, modules, flow diagrams, tools, applications, circuits, elements, and techniques discussed herein may also incorporate and/or utilize the capabilities of the computer 500. Indeed, capabilities of the computer 500 may be utilized to implement features of exemplary embodiments discussed herein.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments.

The operating system 550 may control the execution of other computer programs, and provides scheduling, input-output control, file and data management, memory management, and communication control and related services.

The application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An apparatus for computing a frequency of packets in network devices, comprising:
    memory comprising computer-executable instructions; and
    a processor executing the computer-executable instructions, the computer-executable instructions, when executed by the processor, cause the processor to perform operations comprising:
    associating respective packets with a plurality of entities in a vector, each of the plurality of entities being mapped to corresponding ones of the respective packets and corresponding to a plurality of computers;
    upon at least one network device receiving the respective packets, individually increasing a count for the respective packets mapped to the plurality of entities in the vector;
    computing a matrix vector product of a matrix A and the vector, the matrix A being a product of at least a first matrix and a second matrix, the first matrix comprising rows and columns where each of the rows has a single random location with a one value and remaining locations with zero values; and
    transmitting the matrix vector product to a centralized computer for aggregation with other matrix vector products;
    wherein coordinates of the vector and an approximation vector are identical such that each has identical ones of the plurality of entities mapped at corresponding coordinates.

2. The apparatus of claim 1, wherein the second matrix has a main diagonal with one values and negative one values; and
    wherein other locations, not on the main diagonal, in the second matrix are zero values.

3. The apparatus of claim 2, wherein the one values and the negative one values on the main diagonal are randomly located on the main diagonal.

4. The apparatus of claim 1, wherein the columns of the first matrix comprise a first column through a last column; and
wherein the single random location with the one value in each of the rows of the first matrix is a random selection in any one of the first column through the last column of the first matrix, for each row.

5. The apparatus of claim 1, wherein the matrix A is identical for the network devices.

6. The apparatus of claim 1, wherein the matrix A is identical for the network devices and the centralized computer.

7. The apparatus of claim 1, wherein the matrix A is a product of the first matrix, the second matrix, and a third matrix;
wherein the third matrix is a combination of only one values and negative one values.

\* \* \* \* \*